(12) United States Patent
Loccisano

(10) Patent No.: US 12,084,151 B2
(45) Date of Patent: Sep. 10, 2024

(54) AEROELASTIC RUDDER FOR A WIND TURBINE

(71) Applicant: Vincent Loccisano, Chestnut Hill, MA (US)

(72) Inventor: Vincent Loccisano, Chestnut Hill, MA (US)

( * ) Notice: Subject to any disclaimer, the term of this patent is extended or adjusted under 35 U.S.C. 154(b) by 0 days.

(21) Appl. No.: 18/489,470

(22) Filed: Oct. 18, 2023

(65) Prior Publication Data

US 2024/0166308 A1  May 23, 2024

Related U.S. Application Data

(60) Provisional application No. 63/384,489, filed on Nov. 21, 2022.

(51) Int. Cl.
*F03D 13/25* (2016.01)
*B63B 17/00* (2006.01)
*B63B 21/50* (2006.01)
*B63B 35/44* (2006.01)

(52) U.S. Cl.
CPC .......... *B63B 17/0081* (2013.01); *B63B 21/50* (2013.01); *B63B 35/44* (2013.01); *F03D 13/256* (2023.08); *B63B 2035/446* (2013.01); *F05B 2240/93* (2013.01); *F05B 2240/95* (2013.01); *F05B 2260/964* (2013.01)

(58) Field of Classification Search
CPC ...... F03D 13/256; F03D 1/165; F03D 7/0204; F05B 2260/964; B63B 2035/446
See application file for complete search history.

(56) References Cited

U.S. PATENT DOCUMENTS

| 10,415,547 B2 * | 9/2019 | Loth ...................... F03D 13/22 |
| 2022/0128033 A1 * | 4/2022 | Myers .................... F03D 9/257 |

* cited by examiner

*Primary Examiner* — Sabbir Hasan

(57) ABSTRACT

An apparatus for yawing a turbine into the wind while reducing time-averaged loads has weight-balanced, aerodynamic fairings that cover structural elements of an offshore wind turbine. The aerodynamic fairings provide a rudder effect while a weight-balancing apparatus counters aeroelastic instability and buffers the effects of side gusts.

5 Claims, 3 Drawing Sheets

AEROELASTIC RUDDER FOR A WIND TURBINE

TECHNICAL FIELD

This invention relates in general to offshore wind turbines, and more specifically to an apparatus and method for yawing an offshore wind turbine while mitigating the effects of aeroelastic instability.

BACKGROUND

A wind turbine is a rotating machine that converts kinetic energy from wind into mechanical energy, which is in turn converted to electricity. Utility-scale horizontal axis wind turbines have horizontal shafts and are pointed into the wind by a rotating nacelle. The nacelle commonly houses a direct-drive generator or a transmission-and-generator combination.

Wind turbines used for offshore applications commonly include single-tower systems mounted to the seabed. Floating-wind turbine platforms use shallow submersible or semi-submersible platforms employing spars or spar buoys, tension legs, or a large-area barge-type constructions.

Spars are elongate structures with ballast at the bottom and buoyant structures near the water line, placing the center of gravity lower than the center of buoyancy. A spar is moored to the sea floor.

Tension-leg platforms are permanently moored by tethers or tendons grouped at each of the structure's corners. A group of tethers is referred to as a tension leg. A tension-leg design enables high axial stiffness that mitigates any vertical motion of the platform.

A large-area barge or buoyancy-stabilized platform, is a heavy, floating structure, moored to the sea bed, that supports a vertical-axis turbine. A jack-up barge is similar to an oil or gas platform, but is used as a base for other structures, including offshore wind turbines. The state of the art emphasizes platforms that are immobilized against wave disturbance by mass, mooring, ballast and the like.

Surface oceanic currents are driven by wind currents. Large-scale, prevailing winds drive major, persistent ocean currents. In open ocean, wind and current usually move in the same direction, with winds driving currents. "Side gusts," or gusting winds that are not in the direction of prevailing winds, affect the yaw direction of a wind turbine.

Aeroelasticity relates to interactions between inertial, elastic, and aerodynamic forces occurring while an elastic body is exposed to fluid flow. Dynamic aeroelasticity is a body's vibrational response. Aeroelastic response is defined as the effect of aerodynamic loads on turbine structures. Three primary mechanisms influence this response: buffeting, vortex-shedding and aeroelastic instability. Buffeting is defined as loads due to incoming turbulence loading the structure. Vortex shedding is the alternate shedding of quasi-coherent vortices that detach periodically from alternate sides of a body, generating an oscillatory load. Vortex-shedding is particularly damaging when shedding frequencies are coincident with the natural frequency of support structures. Aeroelastic instability, also known as flutter, occurs when motion-dependent, aerodynamic forces reinforce motion of the structure in a manner sufficient to overcome the structural damping of the system. Flutter occurs when aerodynamic forces on an object couple with a structure's natural mode of vibration to produce rapid periodic motion.

SUMMARY

An apparatus for yawing a turbine into the wind while reducing time-averaged loads has mass-balanced, aerodynamic fairings that cover structural elements of an offshore wind turbine. The aerodynamic fairings provide an alignment moment, and the mass-balancing apparatus reduces aeroelastic instability and buffers the effects of side gusts. In some embodiments the mass-balancing apparatus is an aerodynamic form having an axis of rotation, and weights that are offset from the axis of rotation, so that the aerodynamic form tends to return to its original position when affected by an off-axis gust. The weights provide a restorative moment as they return to their rest position. In other embodiments a mass-balancing apparatus is a spring or other means to impart a restorative moment. One skilled in the art understands that a means to impart a restorative moment may include coiled springs, gas shocks, elastic material and the like. In all embodiments the restorative moment increases as the aerodynamic form is rotated out of alignment with the direction in which the turbine is facing. One skilled in the art understands that a turbine tends to face into the prevailing wind, and that off-axis gusts may interrupt the orientation of the turbine, causing aeroelastic instability.

In an example embodiment, an offshore wind turbine is supported by shallow draft floats arranged in a rectilinear pattern. In some embodiments, the overall structure includes four shallow draft floats placed in a rectilinear pattern, further joined to a four-legged pyramidal structure that supports a wind-turbine rotor and electrical-generation apparatus. Mooring standoffs are connected to a tension member and a hitch point, which in turn are attached to a mooring line. One skilled in the art understands that electricity generated by the wind turbine may be transmitted along a transmission line coupled with the mooring line.

Fins are aerodynamic forms, also referred to as fairings or forms, having a bulbous leading edge and a tapered trailing edge. These fairings are engaged with the legs of the turbine's support structure and have upwind and downwind sections; in some embodiments a weight is located in the upwind section. An off-axis gust causes a deflection of the aerodynamic fairing and raises the weight; with gravity the weight falls, opposing the deflection. One skilled in the art recognizes that this is one embodiment and any embodiment yielding a restorative force following an off-axis gust is suitable for decreasing the off-axis effect.

Fairings are fitted over, and pivot about, vertical structural members that make up the pyramidal structure that supports the wind-turbine rotor. Vertical structural members may also be referred to as legs with a long central axis. Structural members that make up the pyramidal structure are non-vertical; in some embodiments they are between 15° and 25° from vertical, and may be said to be non-vertical. Fairings rotate about, and are coaxial with, the long axis of the legs. Off-axis gusts move fairing toward the direction of the off-axis gust. Weighted leading edges are lifted by off-axis gusts and tend to fall in response, damping the effects of off-axis gusts.

In some embodiments a fairing is an aerodynamic form with a weighted leading edge. In one example the weighted leading edge has elongate weights that may be moved from the leading edge toward the trailing edge, thus crossing the pivot axis and rotating the fairing. One skilled in the art understands that rotating fairings can turn the wind turbine out of the prevailing wind's direction to reduce strain on the turbine rotor in heavy winds.

DESCRIPTION

Figure 1:
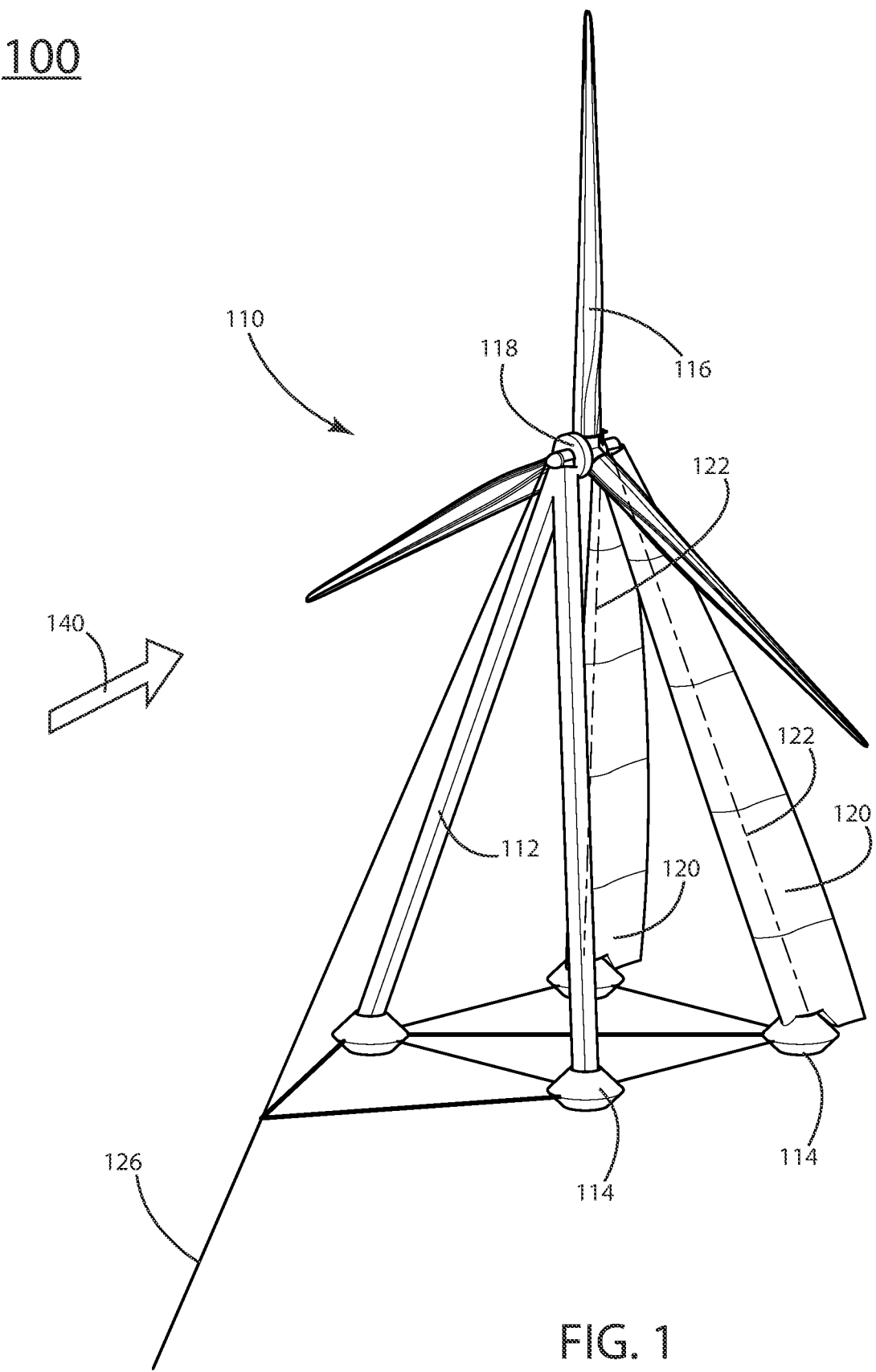
FIG. 1 is a perspective view of an example embodiment with the rotor plane directed into the wind.

In FIG. 1, an example embodiment 100 is an offshore wind turbine 110 having a rotor 116 and electrical-generation equipment 118. In an example embodiment, the wind turbine 110 is moored by mooring line 126 to a permanent structure on the seabed. A structural support system is made up of legs 112 and floats 114. Aerodynamic fairings 120 cover rear legs 112 (FIG. 2), and each pivot about an axis of rotation 122. Wind direction (prevailing wind direction) during normal operation is shown by arrow 140.

Figure 2:
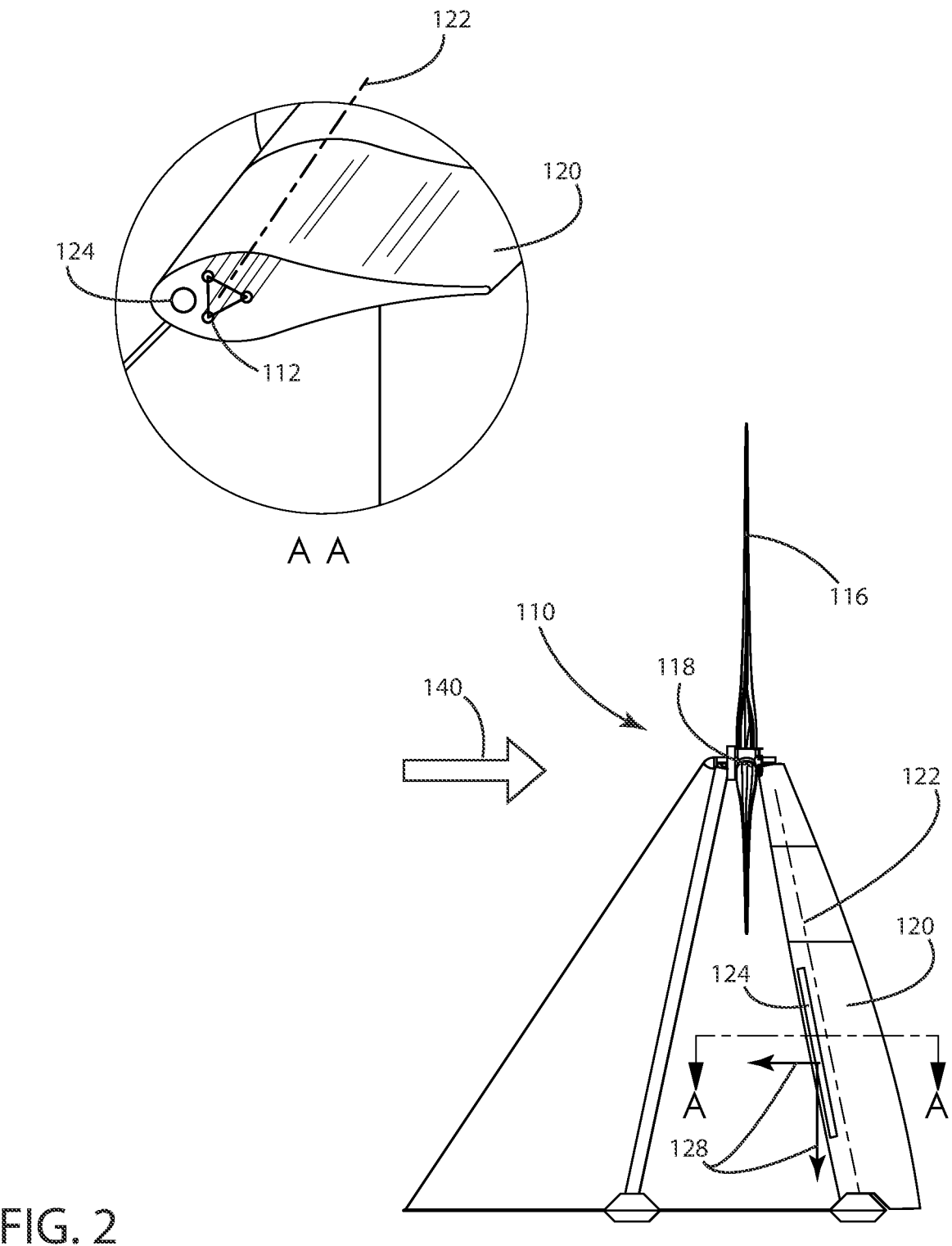
FIG. 2 is a cross-section, detail view thereof.

FIG. 2 is a detailed cross-section showing the internal components of the aerodynamic fairings 120. The aerodynamic fairing 120 is a form that rotates about an axis of rotation 122. A weight 124 is upwind of, and below, the axis of rotation 122. The position of the weight 124 provides force vectors 128. The forward vector 128 may be said to be in an upwind direction when the wind is blowing in the direction of arrow 140. The aerodynamic fairings 120 assist in aligning the turbine with the direction of the wind 140.

The aerodynamic fairings 120 counter the aeroelastic response of the structure to provide aerodynamic damping. The fairing 120 is rotatable about a pivot axis of rotation 122. The fairing 120, in combination with the weight 124, provides weight-balancing. In an example, a side gust may move the fairing 120, rotating it about axis of rotation 122. Axis of rotation 122 is at an angle from the vertical and so the weight 124 moves upward. As the weight 124 falls back to equilibrium the fairing 120 tends to move to a position that is perpendicular with the turbine rotor 116 and therefore in line with the wind direction 140. Acceleration to the left deflects the fairing 120 and raises the weight 124 to increase force to the right. Acceleration to the right deflects the fairing 120 and raises the weight 124 to increase force to the left. The passive action of the aerodynamic fairing 120 in combination with the weight 124 and the non-vertical axis of rotation 122 counters the dynamic amplification factor of forces on the structure.

Figure 3:
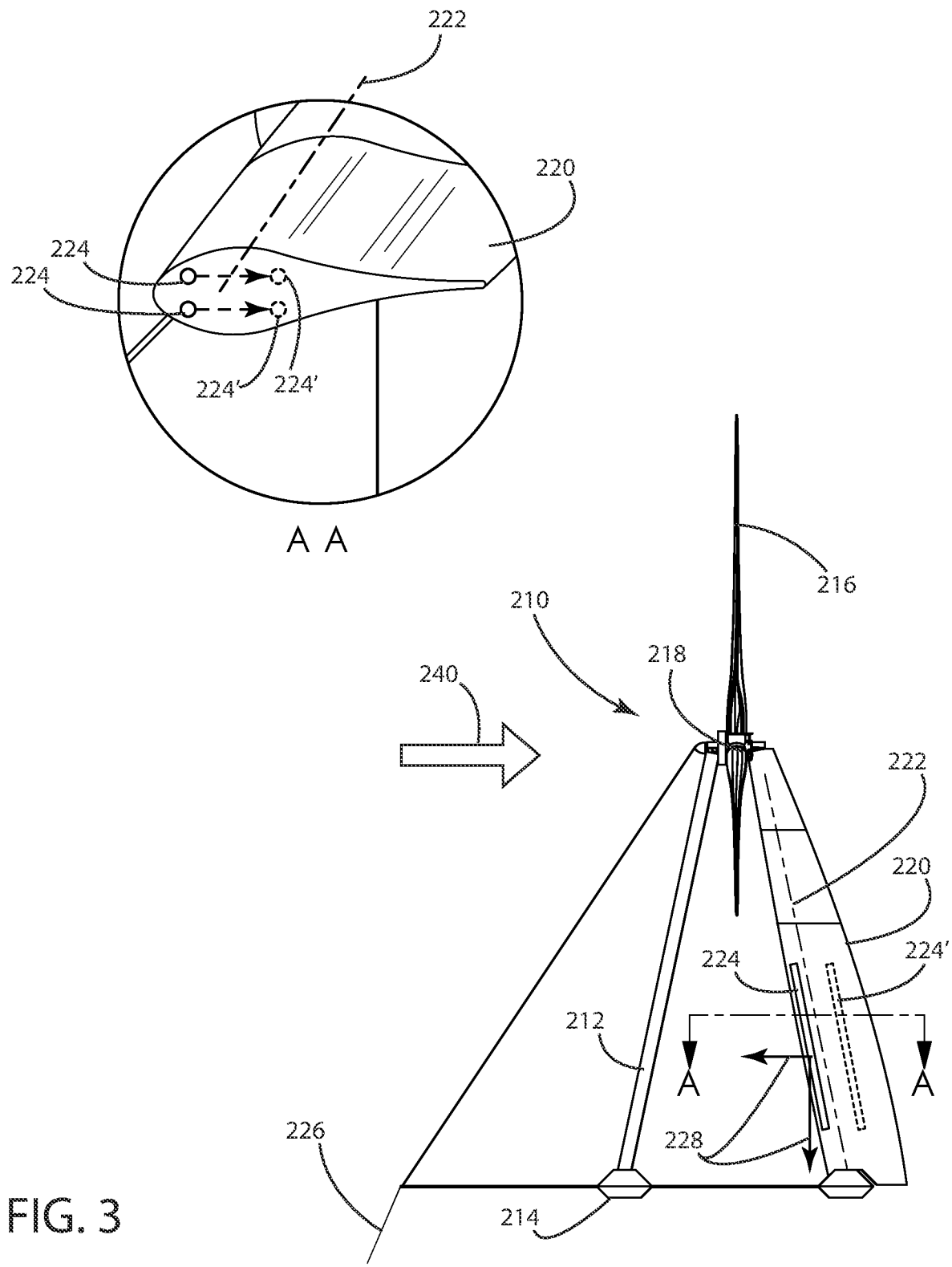
FIG. 3 is a cross-section, detail view of an iteration of the embodiment.

In FIG. 3, an offshore wind turbine 210 has a rotor 216 and electrical-generation equipment 218. In an example embodiment, the wind turbine 210 is moored by mooring line 226 to a permanent structure on the seabed. A structural support system is made up of legs 212 and floats 214. Aerodynamic fairings 220 cover rear legs 212 and pivot about an axis of rotation 222. The wind direction during normal operation is shown by arrow 240.

In the iteration of the embodiment 200, overall weight is distributed by two weights 224 that are movable to a second position 224'. Movement to the downwind side of the axis of rotation 222 will cause the aerodynamic fairing 220 to rotate as the weight falls below the pivot axis 222. By controlling the movement of the weights 224, the aerodynamic fairing 220 may be rotated to direct the turbine structure to respond to wind direction 240.

One skilled in the art understands that the pivoting aerodynamic fairing 120/220 may also be driven to provide an aerodynamic yaw mechanism. One skilled in the art further understands that a system may be operated by wireless technology to send and receive signals to and from control software and apparatuses to rotate the aerodynamic fairings 120/220, controlling the direction of the turbine 110/210 remotely.

These embodiments should not be construed as limiting.

The invention claimed is:

1. An aeroelastic rudder for a wind turbine comprising:
   a moored floating vessel having a plurality of non-vertical legs that support the wind turbine; and
   at least one axis of rotation, coaxial with said non-vertical legs, and engaged with said floating wind turbine; and
   an elongate, aerodynamic fairing having an upwind section and a downwind section, pivotally engaged between said upwind section and said downwind section, with said at least one axis of rotation; and
   at least one weight in said upwind section of said elongate, aerodynamic fairing; wherein
   deflection of said elongate aerodynamic fairing raises said at least one weight, and falling of said weight opposes the deflection.

2. The aeroelastic rudder for a wind turbine of claim 1 further comprising:
   said wind turbine comprising a wide base supported by shallow draft floats; and
   said at least one axis of rotation resides along the center of each of said plurality of non-vertical legs extending from a perimeter of said wide base to a point above said wide base supporting a wind-turbine rotor assembly; wherein
   the angle formed by said at least one axis of rotation extends between said wide base and said wind-turbine rotor assembly.

3. The aeroelastic rudder for a wind turbine of claim 2 further comprising:
   said wide base being a parallelogram supported by at least one shallow draft float at each corner of said parallelogram; and
   four axes of rotation, each extending from one of the corners of the parallelogram to said point above said wide base; wherein
   at least two elongate aerodynamic fairings are engaged with at least two of said four axes of rotation.

4. The aeroelastic rudder for a wind turbine of claim 3 wherein:
   said at least two aerodynamic fairings are engaged with two axes of rotation downwind of said wind-turbine rotor assembly.

5. The aeroelastic rudder for a wind turbine of claim 3 further comprising:
   a mooring hitch point engaged with said parallelogram midway between two corners.

* * * * *